United States Patent [19]
Davis

[11] Patent Number: 5,442,020
[45] Date of Patent: Aug. 15, 1995

[54] BIMETALLIC METALLOCENE ALUMOXANE CATALYST SYSTEM AND ITS USE IN THE PREPARATION OF ETHYLENE-ALPHA OLEFIN AND ETHYLENE-ALPHA OLEFIN-NON-CONJUGATED DIOLEFIN ELASTOMERS

[75] Inventor: Stephen C. Davis, Bright's Grove, Canada

[73] Assignee: Polysar Rubber Corporation, Sarnia, Canada

[21] Appl. No.: 298,495

[22] Filed: Aug. 30, 1994

Related U.S. Application Data

[62] Division of Ser. No. 72,195, Jun. 3, 1993, Pat. No. 5,372,980.

[51] Int. Cl.⁶ .............................................. C08F 4/642
[52] U.S. Cl. ................................... 526/127; 526/160
[58] Field of Search ........................ 526/114, 127, 160

[56] References Cited

U.S. PATENT DOCUMENTS

| | | | |
|---|---|---|---|
| 3,113,115 | 12/1963 | Ziegler et al. | |
| 3,300,459 | 1/1967 | Natta et al. | |
| 4,871,705 | 10/1989 | Hoel | 502/117 |
| 5,001,205 | 3/1991 | Hoel | 526/128 |
| 5,026,798 | 6/1991 | Canich | 526/127 |
| 5,229,478 | 7/1993 | Floyd et al. | 526/160 |

FOREIGN PATENT DOCUMENTS 0347129 12/1989 European Pat. Off.

OTHER PUBLICATIONS

Kaminsky et al, J. Poly. Sci. Polymer Chem Edition, vol. 23, pp. 2151–2164 (1985).
Chien et al, J. Polym. Sci.: Pt.A: Polym. Chem; 29,1603 (1991).
Kolthammer et al, J. Polym. Sci.: Pt.A: Polym. Chem; 30,017 (1992).

*Primary Examiner*—Romulo H. Delmendo
*Attorney, Agent, or Firm*—Joseph C. Gil; Godfried R. Akorli

[57] ABSTRACT

A catalyst system comprising certain bimetallic metallocenes and an alumoxane is provided together with a process for the preparation of high molecular weight ethylene-alpha olefin elastomers and ethylene-alpha-olefin nonconjugated diolefin elastomers wherein the requisite monomers are polymerized in the presence of the bimetallic metallocene/alumoxane catalyst system.

7 Claims, No Drawings

BIMETALLIC METALLOCENE ALUMOXANE CATALYST SYSTEM AND ITS USE IN THE PREPARATION OF ETHYLENE-ALPHA OLEFIN AND ETHYLENE-ALPHA OLEFIN-NON-CONJUGATED DIOLEFIN ELASTOMERS

This application is a division of application Ser. No. 08/072,195 filed Jun. 3, 1993, now U.S. Pat. No. 5,372,480, issued Dec. 13, 1994.

FIELD OF INVENTION

This invention relates to a catalyst system comprising a group IV B transition metal compound and an alumoxane that is highly active in the polymerization of olefins, and to a process using such a catalyst system for the production of polyolefins, in particular for the production of elastomeric ethylene-alpha-olefin copolymers and terpolymers of ethylene, an alpha-olefin and a nonconjugated diolefin.

BACKGROUND OF THE INVENTION

Various processes and catalysts exist for the copolymerization of alpha-olefins. For example, U.S. Pat. No. 3,113,115 (Ziegler et al) discloses that a plastomeric copolymer of ethylene and propylene may be prepared using a catalyst system comprising diethyl aluminum chloride and titanium tetrachloride while U.S. Pat. No. 3,300,459 (Natta et al) discloses that an elastomeric copolymer of ethylene and propylene containing from 20 to about 70 weight percent ethylene can be prepared using a catalyst system comprising trihexyl aluminum and vanadium oxychloride. From this technological base, processes for the production of the commercially important elastomeric ethylene-propylene copolymers, commonly referred to as EP elastomers, and the elastomeric terpolymers of ethylene, propylene and a nonconjugated diolefin, generally referred to as EPDM elastomers, have been developed.

In most current EP and EPDM production processes the catalysts used for the production of the high molecular weight elastomers are soluble catalysts formed from vanadium compounds such as vanadium tetrachloride, vanadium triacetylacetonate, vanadium trialkoxides and halogenated vanadium alkoxides which may be used singly or as a mixture in conjunction with an organoaluminum compound such as triethyl aluminum, diethyl aluminum chloride or ethyl aluminum sesquichloride.

With the recent advent of metallocene-alumoxane coordination catalyst systems for the production of polyethylene and copolymers of ethylene and alpha-olefins such as linear low density polyethylene, some effort has been directed to determining the suitability of particular metallocene-alumoxane catalyst systems for the production of EP and EPDM elastomers.

Kaminsky et al in J. Poly. Sci. Polymer Chem Edition, Volume 23, pp 2151–64 (1985) disclose the use of a soluble bis(cyclopentadienyl) zirconium dimethylalumoxane catalyst system in the polymerization of ethylene, propylene and 5-ethylidene-2-norbornene in toluene solution. By employing the catalyst at low zirconium concentrations, high aluminum to zirconium ratios and long reaction times, Kaminsky et al have been able to prepare, in low yields, high molecular weight EPDM elastomers with a high level of 5-ethylidene-2-norbornene incorporation. However, because of the long induction times required for the catalyst to reach its full activity, a period of the order of hours without the nonconjugated diolefin present, and longer with the nonconjugated diolefin present, precludes the use of such a catalyst system in a commercial operation as such long residence times are economically infeasible.

European patent application 347,129 (Floyd et al to Exxon) discloses that a catalyst system comprising an alkylene or silanylene or mixed alkylene-silanylene bridged bis(substituted cyclopentadienyl) Group IV B transition metal compound and an alumoxane is highly active in the production of high molecular weight EPDM elastomers that have a high ethylene content, a nonconjugated diolefin content of greater than about 3 weight percent and exhibit a low heat of fusion, that is have a low degree of crystallinity. However, in order for this high activity to be realized, the catalyst system has to be supported and a temperature of 50° C. employed. Furthermore, the ethylene pressure used has to be higher than that typically used in the current EP and EPDM production processes which utilize soluble vanadium compounds as catalysts.

U.S. Pat. No. 5,001,205 (Hoel to Exxon) discloses that an elastomeric ethylene-alpha-olefin copolymer may be produced by a slurry polymerization process employing a highly active catalyst system comprising a bis(cyclopentadienyl) group IV B transition metal compound wherein each cyclopentadienyl moiety bears at least two substituents and the two cyclopentadienyl moieties may also be bridged with a linear, branched or cyclic alkylene group, an alkyl substituted silaalkylene group or an alkyl substituted silanylene group and an alumoxane. However, in order for the high activity to be obtained, the catalyst system is first supported on an inert support such as dehydrated silica gel and then is treated with a small amount of ethylene so that an amount of polymer is formed on the catalyst material. The catalyst system thus prepared is then utilized in the preparation of a high molecular weight elastomeric ethylene-alpha-olefin copolymer.

Heretobefore the use of a catalyst system comprising a metallocene wherein there are two transition metal centres and an alumoxane for the copolymerization of ethylene and an alpha-olefin or the terpolymerization of ethylene, an alpha-olefin and a nonconjugated diolefin has not been described.

SUMMARY OF THE INVENTION

It is an objective of this invention to provide a catalyst system comprising a bimetallic metallocene and an alumoxane which is highly active in the production of polyolefins, particularly high molecular weight elastomeric ethylene-alpha-olefin copolymers and ethylene-alpha-olefin nonconjugated diene terpolymers by liquid phase polymerization of the requisite monomers.

It is a further objective of this invention to provide a process for producing an elastomeric ethylene-alpha-olefin copolymer using a catalyst system comprising a bimetallic metallocene and an alumoxane.

Accordingly, in one aspect the invention provides a catalyst system comprising:

(A) a group IV B transition metal component having the general formula

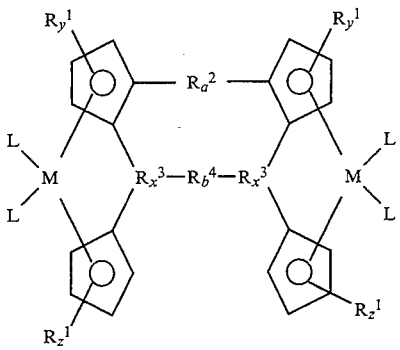

wherein M is zirconium, hafnium or titanium; each $R^1$ which can be the same or different is an alkyl, alkenyl, aryl, alkylaryl or arylalkyl group having from 1 to 20 carbon atoms or two adjacent $R^1$ are joined together forming a ring system having from 4 to 20 carbon atoms

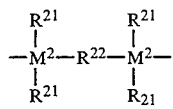

wherein
- $M^2$ is carbon or silicon; each $R^{21}$ which can be the same or different is an alkyl, aryl, alkylaryl or arylalkyl group having from 1 to 8 carbon atoms or can be hydrogen when $M^2$ is carbon, $R^{22}$ is a linear, branched or cyclic alkylene having from 4 to 12 carbon atoms or is a phenylene group or 2 or 3 phenylene groups coupled in the 1 and 4 positions;
- $R^3$ is a dialkyl substituted silanylene, a diaryl substituted silanylene, an alkyl, aryl substituted silanylene, a linear, branched or cyclic alkylene having from 1 to 4 carbon atoms when $R^2$ is present, and is a dialkyl substituted silanylene, a diaryl substituted silanylene or an alkyl, aryl substituted silanylene when $R^2$ is not present;
- $R^4$ is a linear, branched or cyclic alkylene having from 4 to 12 carbon atoms or is a phenylene group or 2 or 3 phenylene groups coupled to one another in the 1 and 4 positions;
- each L is independently a hydrocarbyl group having from 1 to 20 carbon atoms, an alkoxide or aryloxide having from 1 to 8 carbon atoms, a halogen atom or hydrogen atom;
- x, a and b are 0 or 1 with the conditions that a and b cannot both be 1 at the same time and when x=0, a=1 and b=0, y and z which denote the degree of substitution of the cyclopentadienyl rings have the values from 0 to 4 and 0 to 5 respectively; when x=1, a=1 and b=0, y has the value from 0 to 3 and z has the value from 0 to 4; when x=1, a=0 and b=1, both y and z can have any value from 0 to 4; and (B) an alumoxane.

In another aspect, the invention provides a process for producing an ethylene-alpha-olefin elastomeric copolymer comprising:
(i) adding ethylene and an alpha-olefin monomer to a reaction vessel in amounts and under pressure sufficient to maintain the desired ethylene-alpha-olefin ratio in the liquid phase of the reaction vessel; and (ii) adding to the mixture of monomers a catalyst system comprising a group IV B transition metal component having the general formula

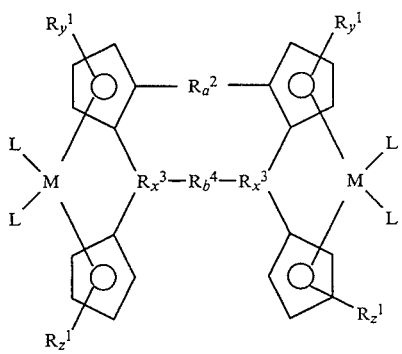

wherein
M is zirconium, hafnium or titanium; each $R^1$ which can be the same or different is an alkyl, alkenyl, aryl, alkylaryl or arylalkyl group having from 1 to 20 carbon atoms or two adjacent $R^1$ are joined together forming a ring system having from 4 to 20 carbon atoms $R^2$ is

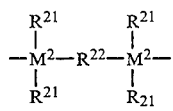

wherein
- $M^2$ is carbon or silicon; each $R^{21}$ which can be the same or different is an alkyl, aryl, alkylaryl or arylalkyl group having from 1 to 8 carbon atoms or can be hydrogen when $M^2$ is carbon, $R^{22}$ is a linear branched or cyclic alkylene having from 4 to 12 carbon atoms or is a phenylene group or 2 or 3 phenylene groups coupled in the 1 and 4 positions;
- $R^3$ is a dialkyl substituted silanylene, a diaryl substituted silanylene, an alkyl, aryl substituted silanylene, a linear, branched or cyclic alkylene having from 1 to 4 carbon atoms when $R^2$ is present, and is a dialkyl substituted silanylene, a diaryl substituted silanylene or an alkyl, aryl substituted silanylene when $R^2$ is not present;
- $R^4$ is a linear, branched or cyclic alkylene having from 4 to 12 carbon atoms or is a phenylene group or 2 or 3 phenylene groups coupled to one another in the 1 and 4 positions;
- each L is independently a hydrocarbyl group having from 1 to 20 carbon atoms, an alkoxide or aryloxide having from 1 to 8 carbon atoms, a halogen atom-or hydrogen atom;
- x, a and b are 0 or 1 with the conditions that a and b cannot both be 1 at the same time and when x=0, a=1 and b=0, y and z which denote the degree of substitution of the cyclopentadienyl rings have the values from 0 to 4 and 0 to 5 respectively; when x=1, a=1 and b=0, y has the value from 0 to 3 and z has the value from 0 to 4; when x=1, a=0 and b=1, both y and z can have any value from 0 to 4; and
- an a lumoxane;

(iii) reacting the mixture for a time sufficient to permit copolymerization of said ethylene and alpha-olefin to an elastomeric copolymer; and (iv) recovering the elastomeric copolymer.

DESCRIPTION OF THE PREFERRED EMBODIMENTS

This invention relates to a catalyst system comprising a bimetallic metallocene and an alumoxane which is highly active in the production of polyolefins, particularly high molecular weight elastomeric ethylene-alpha-olefin copolymers and ethylene-alpha-olefin nonconjugated diene terpolymers by liquid phase polymerization of the requisite monomers.

The bimetallic metallocene component of the metallocene/alumoxane catalyst system employed in the practice of the process of this invention has the following general formula

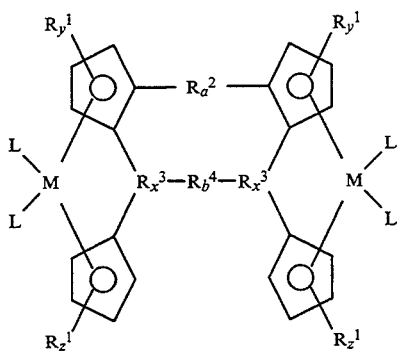

wherein

M is zirconium, hafnium or titanium; each $R^1$ which can be the same or different is an alkyl, alkenyl, aryl, alkylaryl or arylalkyl group having from 1 to 20 carbon atoms or two adjacent $R^1$ groups are joined together forming a ring system having from 4 to 20 carbon atoms thereby giving a saturated or unsaturated polycyclic cyclopentadienyl ligand such as indenyl, tetrahydroindenyl, fluorenyl or octahydrofluorenyl;

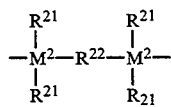

wherein $M^2$ is carbon or silicon; each $R^{21}$ which can be the same or different is an alkyl, aryl, alkylaryl or arylalkyl group having from 1 to 8 carbon atoms or can be hydrogen when $M^2$ is carbon, $R^{22}$ is a linear, branched or cyclic alkylene having from 4 to 12 carbon atoms or is a phenylene group or 2 or 3 phenylene groups coupled in the 1 and 4 positions;

$R^3$ is a dialkyl substituted silanylene, a diaryl substituted silanylene, an alkyl, aryl substituted silanylene, a linear branched or cyclic alkylene having from 1 to 4 carbon atoms when $R^2$ is present, and is a dialkyl substituted silanylene, a diaryl substituted silanylene or an alkyl, aryl substituted silanylene when $R^2$ is not present;

$R^4$ is a linear, branched or cyclic alkylene having from 4 to 12 carbon atoms or is a phenylene group or 2 or 3 phenylene groups coupled to one another in the 1 and 4 positions;

each L independently is a hydrocarbyl group having from 1 to 20 carbon atoms, an alkoxide or aryloxide having from 1 to 8 carbon atoms, a halogen atom or a hydrogen atom;

x, a and b are 0 or 1 with the conditions that a and b cannot both be 1 at the same time and when x=0, a=1 and b=0, y and z which denote the degree of substitution of the cyclopentadienyl rings have the values from 0 to 4 and 0 to 5 respectively; when x=1, a=1 and b=0, y has the value from 0 to 3 and z has the value from 0 to 4; when x=1, a=0 and b=1, both y and z can have any value from 0 to 4.

The bimetallic metallocene is preferably a zirconocene, that is M is zirconium. Suitable alkyl, alkenyl and aryl groups and their substituted derivatives which may be substituted as an $R^1$ group for at least one hydrogen atom on the various cyclopentadienyl rings are methyl, ethyl, propyl, butyl, isobutyl, amyl, isoamyl, hexyl, 2-ethylhexyl, heptyl, octyl, vinyl, allyl, isopropenyl, phenyl, tolyl and the like. A cyclic hydrocarbylene of butylene which is joined to adjacent positions of the cyclopentadienyl ring thereby affording the fused tetrahydroindenyl ring structure is also suitable.

$R^{22}$ groups suitable for forming part of the bridge $R^2$ between the two cyclopentadienyl rings that are coordinated to different transition metal centres include butylene, amylene, hexylene, heptylene, octylene, nonylene, decylene, phenylene, biphenylene, terphenylene and the like, with heptylene, octylene, nonylene, decylene, phenylene and biphenylene being preferred. Suitable $R^{21}$ groups include methyl, ethyl propyl, butyl, isobutyl, amyl, isoamyl, hexyl, 2-ethylhexyl, heptyl, octyl, phenyl, tolyl and the like and when $M^2$ is carbon, the $R^{21}$ group may also be hydrogen and, indeed, is the group of choice. When $M^2$ is silicon, the preferred $R^{21}$ groups are methyl and phenyl, methyl being particularly preferred.

When the $R^2$ group is present in the bimetallic metallocene the $R^3$ groups suitable for the bridge between the two cyclopentadienyl rings coordinated to the same transition metal centre include the linear alkylenes, methylene, ethylene, propylene and butylene, with ethylene being preferred, and the cyclic alkylene cyclobutylene. The $R^3$ group may also be a substituted silanylene, suitable alkyl substituted silanylene groups being dimethyl silanylene, methyl ethyl silanylene, diethyl silanylene and the like, dimethyl silanylene being preferred. Suitable $R^3$ aryl substituted silanylenes include diphenylsilanylene and the like while suitable alkyl, aryl substituted silanylenes include methyl phenyl silanylene, ethylphenyl silanylene and the like.

However, when the $R^2$ group is not present in the bimetallic metallocene and the two bis(cyclopentadienyl) transition metal moieties are joined by the bridge $R^4$ that at each end is linked to the bridge $R^3$ between the two cyclopentadienyl rings both coordinated to the same transition metal centre, suitable $R^3$ groups are the alkyl substituted silanylenes dimethyl silanylene, methyl ethyl silanylene, diethyl silanylene and the like, aryl substituted silanylenes such as diphenylsilanylene and alkyl, aryl substituted silanylenes such as methylphenyl silanylene, ethylphenyl silanylene and the like, with dimethyl silanylene and diphenyl silanylene being preferred. It should be noted that when the $R^4$ group is present in the bimetallic metallocene, the $R^4$ group takes the place of one of the substituents on the $R^3$ groups, that is the R⁴ group takes the place of an alkyl or aryl substituent on the silanylene.

R⁴ groups suitable for the bridge that at each end is linked to a bridge between two cyclopentadienyl rings both coordinated to the same transition metal centre include the linear alkylenes butylene, amylene, hexylene, heptylene, octylene, nonylene, decylene and the like, heptylene, octylene, nonylene and decylene being preferred. Groups suitable for the bridge R⁴ also include the cyclic alkylenes cyclobutylene, cycloamylene, cyclohexylene and the like and the aryl groups, phenylene, biphenylene and terphenylene and their substituted derivatives, phenylene and biphenylene being preferred. To those skilled in the art, it will be apparent that in the practice of this invention the R⁴ group may only be present in the bimetallic metallocene component when two R³ groups are present, each linking two cyclopentadienyl rings coordinated to the same transition metal centre. It should also be noted that the R² group and the R⁴ group may not both be present in the metallocene component at the same time.

Suitable hydrocarbyl groups for L are methyl, ethyl, propyl, butyl, isobutyl, amyl, isoamyl, hexyl, heptyl, octyl, nonyl, decyl, cetyl, 2-ethylhexyl, phenyl, tolyl and the like, with methyl being preferred. Suitable alkoxides and aryloxides for L include methoxide, ethoxide, propoxide, butoxide, t-butoxide, phenoxide, 4-methylphenoxide and the like, methoxide and phenoxide being preferred. Suitable halogen atoms for L are bromine, chlorine, fluorine and iodine with chlorine being preferred.

The examples of the various groups hereinbefore described that may constitute a portion of the metallocene component are for illustrative purposes only and should not be construed to be limiting in any way. A wide variety of bimetallic metallocenes may be formed by the permutation of all possible combinations of the constituent groups with one another. Illustrative nonlimiting examples of the bimetallic metallocenes include the compounds wherein two bis(cyclopentadienyl) transition metal moieties are linked by a bridge between one cyclopentadienyl ring of each moiety exemplified by the structured formula below.

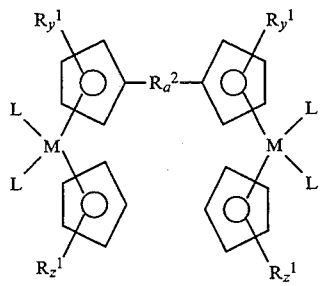

Examples of such compounds include 1,7-(heptylene)-1,1¹ di[bis(cyclopentadienyl) zirconium dichloride], 1,8-(octylene)-1,1¹ di[bis(cyclopentadienyl) zirconium dichloride], 1,9(nonylene)-1,1¹-di[bis(cyclopentadienyl) zirconium dichloride], 1,10-(decylene) 1,1¹di[bis-(cyclopentadienyl)-zirconium dichloride], 1,9-(1,9-disila-1,1,9,9-tetramethylnonylene)-1,1¹-di[bis(cyclopentadienyl)zirconium dichloride], 1,10-(1,10-disila-1,1,10,10-tetramethyldecylene)-1,1¹-di[bis(cyclopentadienyl) zirconium dichloride], 1,12(1,12-disila-1,1,12,12-tetramethyldodecylene) 1,1¹-di[bis(cyclopentadienyl)-zirconium dichloride], [1,4-bis(dimethylsilanylene)benzene]1,1¹di[bis(cyclopentadienyl)zirconium dichloride], [1,4¹-bis(dimethylsilanylene)biphenyl]-1,1¹di[bis(cyclopentadienyl) zirconium dichloride], and [1,4¹¹-bis(dimethylsilanylene)terphenyl]-1,1¹di[bis(cyclopentadienyl)zirconium dichloride]. In the present invention are also included compounds wherein the two bis(cyclopentadienyl) transition metal moieties are linked not only by a bridge between one cyclopentadienyl ring of each moiety but also by a bridge between the two cyclopentadienyl rings of each of the two bis(cyclopentadienyl) transition metal moieties. These compounds are exemplified by the structural formula below.

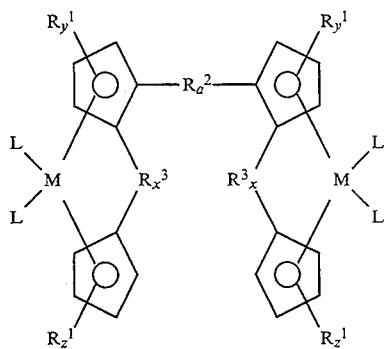

It is not intended that the bridge represented by R² between one cyclopentadienyl ring of each moiety and the bridge represented by R³ between the two cyclopentadienyl rings of each of the two bis(cyclopentadienyl) transition metal moieties necessarily be bonded in a 1,2 manner to each of the two cyclopentadienyl rings. Examples of such compounds include the aforementioned compounds wherein there is an ethylene or a dimethyl silanylene bridge between each of the two cyclopentadienyl rings coordinated to the same zirconium centre.

Also included in the present invention are compounds wherein each of the two bis(cyclopentadienyl) transition metal moieties is linked by a silanylene bridge and there is a bridge between the two silanylene bridges joining the two bis(cyclopentadienyl) moieties together. These compounds are exemplified by the structural formula below.

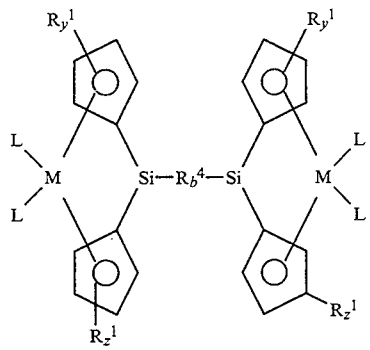

Examples of such compounds include but are not limited to [1,7-disila-1,7-dimethyl-heptadiylidene]-1,1¹,1¹¹, 1¹¹¹-di[bis(cyclopentadienyl) zirconium dichloride], [1,8-disila-1,8-dimethyl-octadiylidene]-1,1¹, 1¹¹, 1¹¹¹-di[bis(cyclopentadienyl) zirconium dichloride], [1,9-disila-1,9-dimethyl-nonadiylidene]-1,1¹, 1¹¹, 1¹¹¹-di[bis(cyclopentadienyl) zirconium dichloride], [1,10-disila- 1,10-dimethyl-decadiylidene]-1,1¹,1¹¹,1¹¹¹-di[bis(cyclopentadienyl)-zirconium dichloride] and [1,12-disila-1,12-dimethyldodecadiylidene]-1,1¹,1¹¹,1¹¹¹-di[bis(cyclopentadienyl) zirconium dichloride].

The compounds wherein two bis(cyclopentadienyl) transition metal moieties are linked by a substituted silaalkylene bridge are generally prepared by first hydrosilylating an $\alpha,\omega$ diolefin with a compound such as chlorodimethyl silane. The resultant bis(chlorodimethylsilyl) alkane is then reacted with an excess of a cyclopentadienyl lithium compound whereupon lithium chloride is liberated and the cyclopentadienyl groups become covalently bound to the disilaalkane. Reaction of the dianion derived from the dicyclopentadienyl substituted product with a cyclopentadienyl transition metal trihalide then provides the bimetallic metallocene. However, when the bridge linking the two bis(cyclopentadienyl) transition metal moieties is an alkylene bridge a different synthetic approach is required. In principle, one such approach involves reacting an $\alpha,\omega$-dibromoalkane such as 1,7-dibromoheptane with an excess of a cyclopentadienyl lithium compound which should result in the liberation of lithium bromide and the cyclopentadienyl groups becoming covalently bound to the alkane. As in the previous instance, the dianion derived from the dicyclopentadienyl substituted alkane may then be reacted with a cyclopentadienyl transition metal trihalide to afford a metallocene wherein two bis(cyclopentadienyl) transition metal moieties are linked by an alkylene bridge. An analogous synthetic approach may be used to prepare compounds wherein the two bis(cyclopentadienyl) transition metal moieties are linked by a 1,4-dialkylene-substituted benzene (or derivative thereof) utilizing a compound such as 1,4-di(bromomethyl) benzene instead of the $\alpha,\omega$-dibromoalkane. When the bridge linking the two bis(cyclopentadienyl)-transition metal moieties is an alkyl substituted 1,4-disilanylenebenzene (or derivative thereof) the synthetic approach may entail the lithiation of the appropriate dibrominated aromatic species such as 1,4-dibromobenzene followed by silylation with chlorodimethylsilane. Free radical chlorination of the resultant silane followed by reaction of the derived bis(chlorodimethyl silane) with an excess of lithium cyclopentadienide should afford the bis(dicyclopentadienylmethyl-silyl) benzene. Subsequent formation of the desired bimetallic metallocene may then be achieved in the same manner as in the aforementioned synthetic processes.

The compounds wherein two bis(cyclopentadienyl) transition metal moieties, each comprising two cyclopentadienyl rings joined to each other by a silanylene bridge and coordinated to the same transition metal, are linked by an alkylene bridge between the two silanylene bridges may in principle be prepared by a modification of the route used in the synthesis of the compounds wherein the only bridge is the alkylene bridge linking the two bis(cyclopentadienyl) transition metal moieties. Thus the $\alpha,\omega$ diolefin may first be hydrosilylated with dichloromethyl-silane and the resultant product treated with excess lithium cyclopentadienide. The resultant bis(dicyclopentadienyl methyl silyl) alkane may then be converted to the desired bimetallic metallocene by the usual method of reaction with a transition metal tetrahalide. Similarly, when the bridge linking the two bis(cyclopentadienyl) transition metal moieties is a phenylene, biphenylene or terphenylene bridge joined at each end to the silanylene bridges of the respective moieties, the compounds may be synthesized by a modification of the route used in the synthesis of the compounds wherein the only bridge is an alkyl substituted disilaphenylene (or derivative thereof). Thus condensation of the dilithio derivative of the appropriate dibrominated aromatic compound with bis(dimethylamino) methylchlorosilane followed by treatment with dilute hydrochloric acid should provide the bis(dichloromethyl-silane). Subsequent reaction with an excess of lithium cyclopentadienide should then provide the required bis(dicyclopentadienyl methyl silane) which may be converted to the bimetallic metallocene in the usual manner.

Variations on the aforementioned synthetic procedures are required in order that compounds wherein the two bis(cyclopentadienyl) transition metal moieties that each have a bridge between the two cyclopentadienyl rings and are also linked by a bridge between one cyclopentadienyl ring of each moiety may be prepared. In principle, the compound wherein the two cyclopentadienyl rings of each of the bis(cyclopentadienyl) transition metal moieties are linked by an alkylene bridge and in addition there is an alkylene bridge between one cyclopentadienyl ring of each of the two bis(cyclopentadienyl) transition metal moieties may be prepared in the following manner. Reaction of an $\alpha,\omega$ dibromoalkane such as 1,7-dibromoheptane with an excess of cyclopentadienyl lithium should result in the formation of 1,7-dicyclopentadienylheptane. Subsequent reaction of the dianion derived from the aforementioned dicyclopentadienyl substituted compound with 1,2-dibromoethane should give rise to a compound wherein each cyclopentadienyl ring bears a $\beta$-bromoethyl substituent. Treatment of this compound with an excess of cyclopentadienyllithium should give rise to a compound wherein there is a heptylene bridge between two cyclopentadienyl rings and an ethylene bridge between each of these two cyclopentadienyl rings and another cyclopentadienyl ring. Subsequent formation of the desired metallocene may then be achieved by reaction of the tetracyclopentadienyl substituted compound with a transition metal tetrahalide such as zirconium tetrachloride.

A further variation in the aforementioned synthetic procedure is required when the bridge between the two cyclopentadienyl rings in each of the two bis( cyclopentadienyl ) transition metal moieties is a silanylene bridge. Reaction of the dianion derived from 1,7-dicyclopentadienyl heptane with dimethyl(dimethyl amino) chlorosilane and subsequent treatment with hydrochloric acid should afford the compound wherein each cyclopentadienyl ring bears a dimethylchlorosilyl substituent. Treatment of this compound with slightly in excess of two equivalents of cyclopentadienyl lithium should afford a compound wherein there is a heptylene bridge between two cyclopentadienyl rings and a dimethyl silanylene bridge between each of these two cyclopentadienyl rings and another cyclopentadienyl ring. Subsequent formation of the desired metallocene may then be achieved in the usual manner by reaction with a transition metal tetrahalide.

The alumoxane component of the catalyst system is an oligomeric aluminum compound represented by the general formula ($R^5$—Al—O) which is a cyclic compound, or $R^5(R^6Al$—O—$)_nAlR_2^7$ which is a linear compound In the general alumoxane $R^5$, $R^6$ and $R^7$ are, independently a $C_1$ to $C_5$ alkyl group such as methyl, ethyl, propyl, butyl, isobutyl or pentyl and n is an integer from 1 to about 50. Preferably $R^5$, $R^6$ and $R^7$ are each methyl and n is at least 4.

As is well known in the art, alumoxanes can be prepared by various procedures. For example, a trialkyl aluminum may be reacted with water, in the form of a moist inert organic solvent; or the trialkyl aluminum may be contacted with a hydrated copper sulphate suspended in an inert organic solvent, to yield an alumoxane. Generally, however prepared, the reaction of a trialkyl aluminum with a limited amount of water yields a mixture of both the linear and cyclic species of alumoxane.

Suitable alumoxanes which may be utilized in the catalyst systems of this invention are those prepared by the hydrolysis of one or more alkyl aluminum reagents such as trimethylaluminum, triethylaluminum, triisobutylaluminum and the like. Commercially available alumoxanes which are suitable for use include the methyl alumoxanes supplied by the Ethyl Corporation or the Sherring Corporation and the modified methyl alumoxane supplied by Akzo (Texas Alkyls division), the modified methyl alumoxane being the alumoxane of choice.

The catalyst system employed in the process of the present invention comprises a complex formed upon admixture of the bimetallic metallocene with an alumoxane. The catalyst system may be conveniently prepared by adding the requisite bimetallic metallocene and the alumoxane, without regard to order, to an alkane or an aromatic hydrocarbon solvent—preferably one which may also be used as a polymerization diluent. When the hydrocarbon solvent used is also suitable for use as a polymerization diluent, the catalyst system may be prepared in situ in the polymerization reactor. The catalyst system may also be prepared separately, in concentrated form, and added to the polymerization diluent in the reactor. Or the components of the catalyst system may be prepared as separate solutions and added to the polymerization diluent in the reactor in appropriate ratios. Alkane and aromatic hydrocarbons suitable as solvents for formation of the catalyst system and also for use as a polymerization diluent include, but are not limited to, straight and branched chain hydrocarbons such as isobutane, butane, pentane, hexane, heptane, octane and the like, cyclic and alicyclic hydrocarbons such as cyclopentane, cyclohexane, cycloheptane, methylcyclopentane, methylcyclohexane, methylcycloheptane and the like, and alkyl-substituted aromatic compounds such as toluene, xylene and the like. Suitable solvents also include liquid olefins which may act as monomers or comonomers including propylene, 1-butene, 1-pentene, 1-hexene, 1-octene and the like.

The catalyst system may also be prepared and employed as a heterogeneous catalyst by adsorbing and complexing the requisite bimetallic metallocene and alumoxane on a catalyst support material such as silica gel, alumina, silica-alumina and mixtures thereof, silica gel being the support material of choice. The catalyst system prepared in this manner is generally employed in a slurry or suspension polymerization procedure with or without additional alumoxane being present in the liquid phase.

The amount of bimetallic metallocene and alumoxane usefully employed in the preparation of the catalyst system can vary over a wide range. The amount of metallocene added should be such as to provide an aluminum to transition metal mole ratio of from about 10:1 to about 5000:1, preferably from about 10:1 to about 4000:1.

While the catalyst system of the present invention may be employed for the homopolymerization of olefins such as ethylene and propylene, it is particularly suited for the preparation of elastomeric copolymers comprised of ethylene and an alpha-olefin or a nonconjugated diolefin and elastomeric terpolymers comprised of ethylene, an alpha-olefin and one or more nonconjugated diolefins.

The alpha-olefins suitable for use in the preparation of elastomeric copolymers and elastomeric terpolymers are preferably alpha-olefins having from 3 to 16 carbon atoms. Illustrative nonlimiting examples of such alpha-olefins are propylene, 1-butene, 1-pentene, 1-hexene, 1-octene and the like, propylene being the alpha-olefin of choice.

The nonconjugated diolefins suitable for use in the preparation of the elastomeric copolymers and elastomeric terpolymers can be straight chain, branched chain or cyclic hydrocarbon diolefins having from 6 to 15 carbon atoms. Illustrative nonlimiting examples are the straight chain acyclic diolefins such as 1,4-hexadiene and 1,6-octadiene; the branched chain acyclic diolefins such as 5-methyl-1,4-hexadiene, 7-methyl-1,6-octadiene and 7-methyl-1,7-octadiene; single ring alicyclic diolefins such as 1,4-cyclohexadiene and 1,5-cyclooctadiene; and multi ring alicyclic fused and bridged ring diolefins such as tetrahydroindene, dicyclopentadiene, 5-vinylidene-2-norbornene, 5-ethylidene-2-norbornene and 5-isopropylidene-2-norbornene; 1,4-hexadiene, 7-methyl-1,6-octadiene and 5-ethylidene-2-norbornene being the nonconjugated diolefins of choice.

The alpha-olefin is generally incorporated into both the elastomeric copolymer and the elastomeric terpolymer at the level of about 25 to about 65 weight percent, preferably from about 30 to about 60 weight percent. The nonconjugated diolefin is generally incorporated into the elastomeric copolymer at the level of about 15 to about 35 weight percent while it is generally incorporated into the elastomeric terpolymer at the level of about 0.5 to about 15 weight percent, more preferably at the level of about 1 to about 10 weight percent. If more than one nonconjugated diolefin is incorporated into the polymer, the total amount of nonconjugated diolefin incorporated is within the limits specified for the incorporation of one nonconjugated diolefin.

Polymerization of the aforementioned monomers using the catalyst system of the present invention may be carried out in either a solution or a slurry process. These processes are generally carried out at temperatures in the range of about $-20°$ C. to about $100°$ C., preferably in the range of about $0°$ C. to about $80°$ C., and under pressures of the order of about 5 to about 700 psig. The aforedescribed solvents that may be used in the preparation of the catalyst system are also suitable for use as polymerization diluents.

Without limiting in any way the scope of the invention, one means by which the solution polymerization process may be carried out is by first introducing the hydrocarbon solvent cyclohexane into a stirred tank reactor. The monomer feed comprising ethylene, the alpha-olefin propylene and the nonconjugated diolefin (if utilized) is then sparged into the liquid phase. A hydrocarbon solution of the alumoxane followed by a hydrocarbon solution of the bimetallic metallocene in the required ratios are then added to the liquid phase in the reactor. The reactor thus contains a liquid phase composed substantially of cyclohexane, together with dissolved ethylene and propylene gases, the nonconjugated diolefin (if utilized) and the components of the catalyst system, and a vapour phase composed of the vapours of all the aforementioned species. The rate of polymerization is controlled by the concentration of the catalyst. The reactor temperature is controlled by means of cooling coils, etc. and the initial total pressure in the reactor is maintained by a constant flow of ethylene and propylene gases. By maintaining a faster rate of flow of the ethylene and propylene gases through the reactor than the rate of polymerization, the conditions in the reactor approximate steady state conditions. The ethylene content of the polymer product is determined by the bimetallic metallocene used and by the ratio of ethylene to propylene in the reactor, which is controlled by manipulating the relative feed rates of these components to the reactor. After polymerization and deactivation of the catalyst together with coagulation of the polymer by the introduction of alcohol into the reactor, the product polymer can be recovered by any suitable means.

The polymerization may also be conducted by a slurry process and this is the polymerization process of choice. In this process, a suspension of the solid, particulate polymer is formed in the hydrocarbon diluent to which ethylene, the alpha-olefin, the nonconjugated diolefin (if utilized) and the components of the catalyst system have been added.

EXAMPLES

In the examples which illustrate the practice of the invention the analytical techniques described below were employed for the analysis of the resulting polyolefins. Molecular weight determinations were made by Gel Permeation Chromatography (GPC) according to the following technique. Molecular weights were measured using a Waters 150 gel permeation chromatograph equipped with a differential refractive index (DRI) detector, the instrument being calibrated with polystyrene-standards having a narrow molecular weight distribution. The system was used at 120° C. with 1,2,4-trichlorobenzene as the mobile phase. Phenogel (Phenomonix) polystyrene gel columns were used.

The weight percent ethylene in the polyolefin products was determined by Fourier Transform Infra Red (FTIR) spectrometry. Polymeric films were pressed at 150° C. and the spectra recorded using a Bruker IFS-45 FTIR spectrometer operated in the absorbance mode. Quantitation of the ethylene content was made empirically using the calibration equation $$\log(abs_{1167}/abs_{973}) - 0.795]/[-0.023]$$

where $abs_{1167}$ is the intensity of the absorbance of the peak in the infrared spectrum at 1167 cm$^{-1}$.

The following examples are intended to illustrate specific embodiments of the invention and are not intended to limit the scope of the invention.

All procedures for the preparation of the catalyst system were performed under an inert atmosphere of nitrogen or argon.

The alumoxane used was a modified methyl alumoxane obtained as a solution in toluene (6.0 weight percent aluminum) from Akzo (Texas Alkyls division). Polymer grade ethylene and polymer grade propylene obtained from Matheson Gas Products Ltd. were used after drying with 3Å molecular sieves.

Example 1

The example describes the preparation of the bimetallic metallocene 1,10-(1,10-disila-1,1,10,10-tetramethyldecylene)-1,1$^1$-di[bis(cyclopentadienyl) zirconium dichloride].

Dimethylchlorosilane (6.8 mL, 60 mmol) in CH$_2$Cl$_2$(10 mL) was added by dropping funnel over 10 minutes to a mixture of 1,7-octadiene (4.5 mL, 30 mmol) and bis (tetrabutylammonium) hexachloroplatinate (272 mg, 0.3 mmol). After 3 hours at room temperature, the solvent was removed in vacuo and the residue taken up in pentane. The majority of the catalyst was removed by filtration under nitrogen and the filtrate was concentrated in vacuo to provide as an oily liquid 1,8bis(-chlorodimethyl silyl) octane $^1$H NMR (200 MHz, CDCl$_3$)δ 1.94–1.75 (m,10H), 0.80 (t,4H), 0.40 (s.12H).

Freshly cracked cyclopentadiene (5.5 mL, 65 mmol) was added to a solution of n-butyllithium (26 mL, 65 mmol, 2.5M in hexane) in THF (20 mL) at −78° C. and then the crude chlorosilane was added by syringe. The solution was allowed to warm to 25° C. overnight and then the reaction mixture was quenched at 0° C. with saturated aqueous NH$_4$Cl, diluted with Et$_2$O and washed twice with H$_2$O. After drying over Na$_2$SO$_4$, the ethereal solution was filtered and the solvent removed in vacuo. The resulting viscous oil was dissolved in distilled hexane (25 mL), cooled to −78° C. and treated with n-BuLi (26 mL, 65 mmol, 2.5M in hexane). The resulting off-white solid was filtered under nitrogen and dried in vacuo. The yield of the dilithio salt of 1,8bis(cyclopentadienyl dimethyl silyl) octane was 6.7 g (18.1 mmol, 60% yield based on 1,7-octadiene).

A solution of the biscyclopentadiene (4.5 g, 12.5 mmol) in Et$_2$O (150 mL) was cooled to −78° C. and thallous ethoxide (6.34 g, 25 mmol) was added. After being allowed to warm to 25° C., the reaction mixture was stirred for 12 hours. The solvents were removed in vacuo and the brown solid was then stirred with 30 mL of Et$_2$O. The suspension was allowed to settle, the supernatant removed by syringe, and the solid dried under high vacuum. Yield 76.5% (7.3 g, 9.56 mmol).

CpZrCl$_3$(4.9 g, 18.7 mmol) was suspended in toluene (100 mL) and THF was added until all the solid had dissolved (ca. 7 mL). The solution was then added via a cannula to the dithallium salt in toluene (100 mL). The reaction mixture was heated at reflux for 72 hours, during which time an additional 200 mL of THF was added in portions. The reaction mixture was then filtered and the solvents removed in vacuo.

The crude product was purified by chromatography on Bio-Beads SX-2 (Bio-Rad Laboratories). Upon removal of the solvent, a 75% yield (5.7 g, 7 mmol) of 1,10-(1,10-disila-1,1,10,10-tetramethyldecylene)-1,1$^1$di[bis(cyclopentadienyl) zirconium dichloride] as a grey white solid was obtained.

Elemental analysis Calculated for C$_{32}$H$_{46}$Cl$_4$Si$_2$Zr$_2$: C 47.38, H 5.72 Found: C 47.51, H 5.91

$^1$H NMR (250 MHz CDCl$_3$) δ 0.29(s, 12.4 H$^2$(Me-Si); 0.71(m, 4H (CH$_2$—Si)); 1.22 (m, 13.5 H(CH$_2$)$_6$); 6.45 (s,9.5H); 6.55 (m,4H)); 6.71 (m,4H)-cyclopentadienyl protons.

Chemical ionization mass spectrum (ammonia gas)
Parent ion: 828 (Formula weight 809.6+NH$_4$$^+$)

The following examples illustrate the copolymerization of ethylene and propylene.

Examples 2–4

A 1 liter glass bottle provided with a magnetic stirbar and capped with a two hole crown cap sealed with a fluorinated rubber gasket was charged with 200 ml of dry cyclohexane and then placed in an ice bath. The liquid was purged and saturated with the monomer feed of ethylene and propylene at 15 psig total pressure. Both the ethylene and propylene monomers were fed into and out of the glass bottle at flow rates of 1000 sccm with the pressure being maintained via a backpressure regulator. After the system was equilibrated at 0° C., 2.9 ml of the modified methyl alumoxane solution was added, followed by 3.0 ml of a 1.6 mM solution of 1,10 -(1,10-disila-1,1,10,10-tetramethyldecylene) -1,1$^1$di[bis(-cyclopentadienyl) zirconium dichloride]. The polymerization was stopped after the desired time of 20 minutes by the addition of 2 ml of ethanol and the monomer gases vented. A hindered phenol antioxidant was then added to the solution and the polymer coagulated and washed with ethanol. The polymer crumb was washed, then filtered and dried at 60° C. under vacuum. The results of the three polymerizations are reported in Table 1.

Comparative Examples 5,6

The procedure of Example 2 was followed with the exception that 3.0 ml of a 1.6 mM solution of ethylene bis(tetrahydroindenyl) zirconium dichloride in toluene was used as a component of the catalyst system. The results of the two polymerizations are reported in Table 1.

Comparative Examples 7,8

The procedure of Example 2 was followed with the exception that 3.0 ml of a 1.6 mM solution of bis(cyclopentadienyl) zirconium dichloride in toluene was used as a component of the catalyst system. The results of the two polymerizations are reported in Table 1.

Example 9

A 1 liter steel reactor containing a diluent was pressurized to a total pressure of 100 psig with ethylene and propylene in the liquid mole ratio of 1:6.7 at 10° C. Modified methylalumoxane solution (2.4 ml) was added, followed by 0.7 ml of a 1.6 mM solution of 1,10-(1,10-disila-1,1,10,10-tetramethyldecylene 1,1$^1$-di[bis(-cyclopentadienyl)zirconium dichloride]. Ethylene was supplied to maintain the initial total pressure in the reactor. After reaction for 30 minutes, the monomers were flashed off and the temperature raised to ambient. The polymer product was recovered from the reactor and dried at 60° C. in a vacuum oven. The results of the polymerization are reported in Table 1.

Comparative Example 10

A 1 liter steel reactor containing a diluent was pressurized to a total pressure of 100 psig with ethylene and propylene in the liquid mole ratio of 8.3. Modified methylalumoxane solution (3.5 ml) was added, followed by 1.7$\mu$ moles of ethylene bis(tetrahydroindenyl) zirconium dichloride in solution. Ethylene was supplied to maintain the initial total pressure in the reactor. After reaction for 40 minutes, the monomers were flashed off and the temperature raised to ambient. The polymer product was recovered from the reactor and dried at 60° C. in a vacuum oven. The results of the polymerization are reported in Table 1.

From the results in Table 1, the effect of the metallocene structure on the activity and product properties in a series of polymerizations carried out under identical reaction conditions can be seen. The polymerizations with a metallocene that has a structure according to the present invention (Expts. 2–4) provide at a comparatively high activity, a high molecular weight copolymer with a medium ethylene content while the copolymers obtained from the high activity polymerizations with the ethylene bridged bis(tetrahydroindenyl) zirconium dichloride (Expts 5,6) have a low ethylene content. The use of the bimetallic metallocene as part of the catalyst system enables control of the copolymerization reactivity ratios in a manner such that there is not the need to resort to high ethylene pressures in order to obtain at comparatively high activity a copolymer with a medium ethylene content.

A comparison of Expt. 9 with Expt. 10 reveals that the polymerization activity of the metallocene that has a structure according to the present invention is higher than that of the ethylene bridged bis(tetrahydroindenyl) zirconium dichloride, and although reaction conditions are comparable a copolymer with a much higher ethylene content is obtained when the metallocene used has a structure according to the present invention rather than ethylene bridged bis(tetrahydroindenyl) zirconium dichloride.

The high activity of the bimetallic metallocene is somewhat surprising as it has been suggested by both Chien et al in J. Polym. Sci.: Pt.A: Polym. Chem; 29,1603(1991) and Kolthammer et al in J. Polym. Sci.: Pt.A: Polym. Chem; 30,017(1992) that second order catalyst deactivation occurs with metallocenes. For, as a second order deactivation process indicates an interaction between two transition metal centres it would be expected that a molecule containing two metal centres in close proximity would have a high deactivation rate.

Example 11

This example illustrates the homopolymerization of propylene using a bimetallic metallocene as a component of the catalyst system.

A 1 liter glass bottle provided with a magnetic stirbar and capped with a two hole crown cap sealed with a fluorinated rubber gasket was charged with 200 ml of dry cyclohexane at 22° C. The liquid was purged and saturated with propylene at 15 psig total pressure. Propylene was continuously fed into and out of the glass bottle at a flow rate of 1000 sccm with the initial total pressure being maintained via a backpressure regulator. The modified methylalumoxane solution (2.9 ml) was added, followed immediately by 3.0 ml of a 0.8 mM solution of 1,10-(1,10-disila-1,1,10,10-tetramethyl-decylene)-1,1$^1$-di[bis(cyclopentadienyl) zirconium dichloride]. The polymerization was stopped after 60 minutes by the addition of 2 ml of ethanol and propylene gas vented. A hindered phenol antioxidant was then added to the solution and the polymer coagulated and washed with ethanol. The atactic polypropylene was then filtered and dried at 60° C. under vacuum. A yield of 7.3 g of polypropylene was obtained at a catalyst activity of 1,500 Kg polypropylene/mol Zr/hr.

Comparative Example 12

The procedure of Example 11 was repeated except that 24$\mu$M of bis(cyclopentadienyl) zirconium dichloride was used instead of the bimetallic metallocene. A yield of 2.5 g of atactic polypropylene was obtained at catalyst activity of 520 Kg polypropylene/mol Zr/hr.

Example 13

This example illustrates the homopolymerization of ethylene using a bimetallic metallocene as a component of the catalyst system.

The procedure of Example 11 was repeated except that ethylene gas was used instead of propylene, 2.0 ml of a 0.8μM solution of 1,10-(1,10-disila-1,1,10,10-tetramethyldecylene)-1,1$^1$-di[bis(cyclopentadienyl) zirconium dichloride] was used instead of 3.0 ml and the reaction time was 5 minutes. A yield of 1.8 g of polyethylene was obtained at a catalyst activity of 6,825 Kg polyethylene/mol Zr/hr.

Example 14

This example illustrates the copolymerization of ethylene and 5 ethylidene-2-norbornene. (ENB)

The procedure of Example 11 was repeated except that the 5-ethylidene-2-norbornene (2.0 ml, 15 mM) was also charged to the glass bottle, 2.0 ml of a 0.8 mM solution of 1,10-(1,10-disila-1,1,10,10-tetramethyldecylene)-1,1$^1$-di bis (cyclopentadienyl) zirconium dichloride was used instead of 3.0 ml and the reaction time was 41 minutes. A yield of 2.66 g of the ethylene-5-ethylidene-2-norbornene copolymer having an ethylene content of 74.5 weight percent was obtained at a catalytic activity of 1,216 Kg ethylene-ENB copolymer/mol Zr/hr.

Example 15

This example illustrates the terpolymerization of ethylene, propylene and 5-ethylidene-2 norbornene (ENB).

A 1 liter glass bottle provided with a magnetic stir bar and capped with a two hole crown cap sealed with a fluorinated rubber gasket was charged with 200 mL of dry cyclohexane, followed by 5-ethylidene-2-norbornene (1 mL, 7.4 mmol). The liquid was purged and saturated with the monomer feed of ethylene and propylene at 15 psig total pressure. The flow rate of ethylene into and out of the glass bottle was 1000 sccm while the flow rate of propylene was 500 sccm with the pressure being maintained via a back pressure regulator. After the system was equilibrated at 22° C., 2.9 mL of the modified methyl alumoxane solution was added, followed by 3.0 mL of a 1.6 mM solution of 1,10- (1,10-disila-1,1,10,10-tetramethyldecylene)-1,1$^1$-di[bis(cyclopentadienyl)zirconium dichloride]. The polymerization was stopped after the desired time of 20 minutes by the addition of 2mL of ethanol and the monomer gases vented. A hindered phenol antioxidant was then added to the solution and the polymer coagulated and washed with ethanol. The polymer crumb was washed, then filtered and dried at 60° C. under vacuum. A yield of 4.87 g of the ethylene-propylene-5-ethylidene-2 norbornene terpolymer having an ethylene content of 60 weight percent and a 5-ethylidene-2-norbornene content of 13.3 weight percent and a molecular weight of 314,000 was obtained at a catalytic activity of 3,047 Kg ethylene-propylene-ENB terpolymer/mol Zr/hr.

TABLE I

| Expt. No. | Catalyst | Cocatalyst | Pressure psig | [E] m | [P] m | E/P | Activity Kg/MolZr/hr | Yield g | Wt % E | MW ($\times 10^3$) |
|---|---|---|---|---|---|---|---|---|---|---|
| 2 | C-8-Dimer | MMAO | 15 | 0.234 | 1.63 | 0.144 | 7,156 | 11.45 | 40 | 222 |
| 3 | C-8-Dimer | MMAO | 15 | 0.234 | 1.63 | 0.144 | 5,819 | 9.31 | 45 | 229 |
| 4 | C-8-Dimer | MMAO | 15 | 0.234 | 1.63 | 0.144 | 5,906 | 9.45 | 46 | 222 |
| 5 | BETH | MMAO | 15 | 0.234 | 1.63 | 0.144 | 9,963 | 15.94 | 28 | 89 |
| 6 | BETH | MMAO | 15 | 0.234 | 1.63 | 0.144 | 8,281 | 13.25 | 30 | 105 |
| 7 | Cp$_2$ZrCl$_2$ | MMAO | 15 | 0.234 | 1.63 | 0.144 | 3,319 | 5.31 | 67 | 89 |
| 8 | Cp$_2$ZrCl$_2$ | MMAO | 15 | 0.234 | 1.63 | 0.144 | 3,425 | 5.48 | 69 | 99 |
| 9$^a$ | C-8-Dimer | MMAO | 99 | 0.82 | 5.46 | 0.1 | 69,714 | 39.04 | 70 | 1002 |
| 10$^b$ | BETH | MMAO | 100 | 0.82 | 6.8 | 0.1 | 49,900 | 39.9 | 53 | 1603 |

C-8-Dimer = 1,10-(1-10-disila-1,1,10,10-tetramethyldecylene)1,1$^1$-di[bis(cyclopentadienyl)zirconium dichloride]
BETH = ethylene bis(4,5,6,7-tetrahydroindenyl) zirconium dichloride
Cp$^2$ZrCl$_2$ = bio(cyclopentadienyl)zirconium dichloride
MMAO = modified methylalumoxane (6.0 weight percent aluminum in toluene - Akzo (Texas Alkyls division)
Note:
Unless otherwise specified, the polymerizations were run at 0° C. for 20 mins. using a zirconium concentration of 24 μM and a methylalumoxane concentration of 27.55 mM.
$^a$Used a zirconium concentration of 2 μM and a methylalumoxane concentration 9.1 mM, temperature 10° C., 30 min. run.
$^b$Used a zirconium concentration of 2.9 μM and a methylalumoxane concentration of 12.1 mM, temperature 10° C., 40 min. run.

What is claimed is:

1. A process for producing an ethylene-alpha-olefin elastomeric copolymer comprising:
   (i) adding ethylene and an alpha-olefin monomer to a reaction vessel in amounts and Under pressure sufficient to maintain the desired ethylene-alpha-olefin weight ratio in the liquid phase in the reaction vessel; and
   (ii) adding to the mixture of monomers a catalyst system selected from the group consisting of 1,9-(1,9-disila -1,1,9,9-tetramethylnonylene)-1,1$^1$-di[bis(cyclopentadienyl) zirconium dichloride], 1,10-(1,10-disila-1,1,10,10-tetramethyldecylene)-1,1$^1$-di[bis(cyclopentadienyl) zirconium dichloride], 1,12-(1,12-disila-1,1,12,12-tetramethyldodecylene)-1,1$^1$-di[bis(cyclopentadienyl) zirconium dichloride], [1,7 -disila-1,7-dimethyl-heptadiylidene]-1,1$^1$,1$^{11}$,1$^{111}$-di[bis(cyclopentadienyl) zirconium dichloride], [1,8-disila-1,8-dimethyl-octadiylidene]-1,1$^1$,1$^{11}$,1$^{111}$-di[bis(cyclopentadienyl) zirconium dichloride], [1,9-disila-1,9-dimethyl-nonadiylidene]-1,1$^1$, 1$^{11}$, 1$^{111}$di[bis(cyclopentadienyl) zirconium dichloride], [1,10-disila-1,10-dimethyl-decadiyliden]-1,1$^1$, 1$^{11}$, 1$^{111}$-di-[bis(cyclopentadienyl) zirconium dichloride] and [1,12-disila-1,12-dimethyl-dodecadiylidene]-1,1$^1$, 1$^{11}$, 1$^{111}$-di[bis(cyclopentadienyl) zirconium dichloride]; and an alumoxane;
   (iii) reacting the mixture for a time sufficient to permit copolymerization of said ethylene and alpha-olefin to an elastomeric copolymer, and
   (iv) recovering the elastomeric copolymer.

2. The process of claim 1 wherein a nonconjugted diolefin is added together with the ethylene and the alpha olefin.

3. The process of claim 1 wherein the reaction vessel further contains a hydrocarbon polymerization diluent.

4. The process of claim 1 wherein the alpha-olefin is propylene.

5. The process of claim 2 wherein the alpha-olefin is propylene and the nonconjugated diolefin is selected from the group consisting of 1,4-hexadiene, 7-methyl-1,6-octadiene and 5-ethylidene-2-norbornene.

6. The process of claim 1 wherein the alumoxane is methyl alumoxane.

7. The process of claim 2 wherein the alumoxane is methyl alumoxane.

* * * * *